(12) United States Patent
Fourtet et al.

(10) Patent No.: US 6,625,470 B1
(45) Date of Patent: Sep. 23, 2003

(54) TRANSMITTER

(75) Inventors: Christophe Fourtet, Pompignan (FR); Cyril Quennehen, Toulouse (FR); Magalie Klein, Garenne-Colombes (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/517,706

(22) Filed: Mar. 2, 2000

(51) Int. Cl.⁷ ................................................ H04M 1/00
(52) U.S. Cl. ........................ 455/553; 455/127; 455/552; 455/91; 455/82; 455/83; 330/149; 330/136; 330/138; 333/126; 333/129
(58) Field of Search ............................... 455/78, 82, 83, 455/127, 552, 553, 91, 126; 330/149, 136, 138; 333/126, 129

(56) References Cited

U.S. PATENT DOCUMENTS

| | | | | |
|---|---|---|---|---|
| 4,442,416 A | * | 4/1984 | Epsom et al. | 333/263 |
| 4,764,494 A | * | 8/1988 | Sakabe et al. | 501/138 |
| 5,386,203 A | * | 1/1995 | Ishihara | 333/129 |
| 5,423,074 A | * | 6/1995 | Dent | 455/74 |
| 5,936,439 A | * | 8/1999 | Pollersbeck | 327/110 |
| 6,091,966 A | * | 7/2000 | Meadows | 455/553 |
| 6,147,571 A | * | 11/2000 | Kitazawa et al. | 333/126 |
| 6,154,664 A | * | 11/2000 | Chorey et al. | 455/571 |
| 6,298,244 B1 | * | 10/2001 | Boesch et al. | 455/553 |

FOREIGN PATENT DOCUMENTS

| | | | | |
|---|---|---|---|---|
| EP | 823751 | 11/1998 | | H01Q/21/30 |
| GB | 2322493 | 8/1998 | | H04B/1/04 |
| GB | 2326799 | 12/1998 | | H04B/1/48 |

* cited by examiner

*Primary Examiner*—William Trost
*Assistant Examiner*—Danh Le

(57) ABSTRACT

A dual band transmitter (1) including: a lower band power amplifier (2) and a higher band power amplifier (3), a lower band transmit path (4) between the output of the lower band power amplifier (2) and a combining means (8); and a higher band transmit path (5); between the output of the higher band power amplifier (3) and the combining means (8). A surface mounted device includes a stub (6) having a first (61) and a second (62) end, the first end of the stub (6) being connected to the higher band transmit path (5) and the second end of the stub (6) being coupled to a switch. The second (62) end of the stub (6) is substantially closed or opened, in dependence upon the state of the switch, so that, in use, spurious harmonics are prevented from being generated in, and transmitted from, the transmitter (1).

The lower band transmit path (4) incorporates a lower band low pass filter (48) for removing all signals having a frequency greater than or equal to the second harmonic of the lower band wanted signal; and the higher band transmit (5) path includes a higher band low pass filter (58) for removing all signals having a frequency greater than or equal to the second harmonic of the higher band wanted signal.

10 Claims, 1 Drawing Sheet

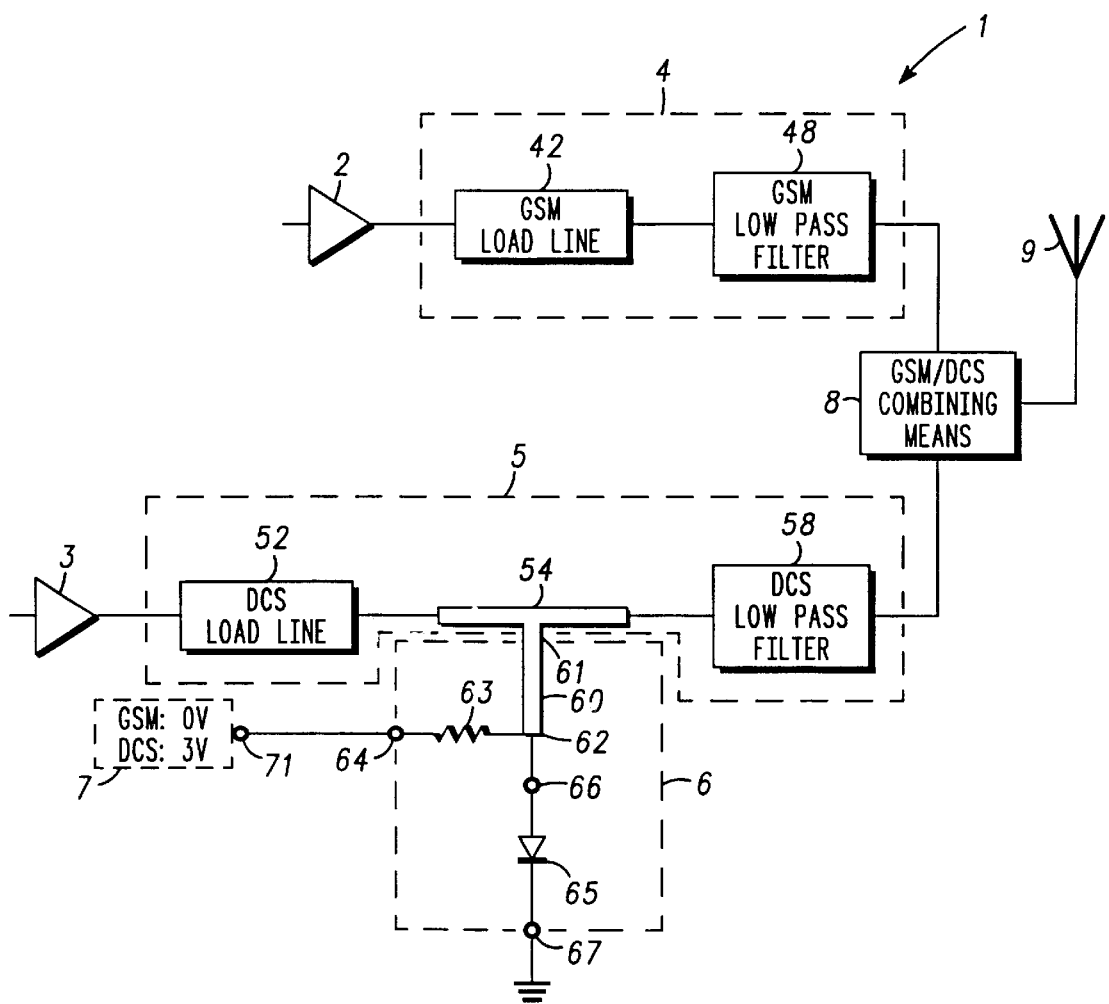

TRANSMITTER

FIELD OF THE INVENTION

The present invention relates to a transmitter and a method of operating a transmitter, and in particular to a dual band radio transmitter and a method of operating a dual band radio transmitter.

BACKGROUND OF THE INVENTION

In order to overcome problems concerning the lack of channel capacity for portable communication devices such as cellular mobile telephones, there is a requirement to produce devices capable of communication in two separate radio bands. In Europe, there is a drive towards so-called dual band devices operating both at 900 MHz (GSM) and at 1800 MHz (DCS). Such dual band devices require a corresponding dual band transmitter. These dual band transmitters will typically have a lower band transmit path (e.g. for passing 900 MHz signals) and a higher band transmit path (e.g. for passing 1800 MHz signals). One difficulty faced by dual band transmitters is that when they are transmitting at the lower band frequency (e.g. 900 MHz) unwanted harmonics of tne lower band frequency may be coupled to the higher band transmit path; additionally, coupling of the lower band signals to the higher band transmit path may cause the higher band transmit path to generate unwanted harmonics of the lower band signal in addition to those generated in the lower band transmit path such that even a perfectly linear lower band transmit path (which generates no unwanted harmonics itself) could still give rise to an unacceptably large amount of energy being transmitted at the second or higher harmonic frequencies of the lower band signal due to regeneration in the higher band transmit path.

Note that this problem arises where the second or higher harmonics are close to or less than the frequency of the higher band (since otherwise a passive low pass filter can be used to remove any signals of a higher frequency than the higher band frequency which will filter out second or higher harmonics from the lower band transmit path). In the case of GSM and DCS dual band transmitters, the problem is especially acute since the second harmonic of the lower band is exactly equal to the frequency of the higher band (1800 MHz).

There are a number of conventional dual band transmitters which address this problem. One particularly simple and robust solution is to provide two separate transmit paths (including separate power amplifiers and separate passive filters) which are combined together at the antenna, with sufficient rf shielding between the two paths to provide at least 50 dB of isolation between the two paths. The disadvantage of this solution however is that it is very space inefficient and is therefore undesirable for modern portable communication devices.

An alternative known solution in which there is no significant shielding between the lower and higher band transmit paths (thus enabling them to be formed within a single package) requires the use of a switchable low pass filter. Note, however, that even without shielding, the leakage from one transmit path to the other will still be relatively small (e.g. there will be about 30 dB of isolation between the paths), but this must still be considerably reduced to comply with most telecommunications standards (e.g. the GSM specification requires that any unwanted harmonics are at least 70 dB lower than the transmitted signal). The switchable low pass filter may be configured either as a higher band low pass filter or as a low pass filter incorporating the rejection of the lower band second harmonic within the higher band transmit path. In a similar alternative known solution, there is only a single transmit path including a switchable power amplifier which may be switched between operating at the lower band and the higher band together with a switchable low pass filter as before. The basic structure of a low pass filter is a capacitor connected in parallel with the output of the power amplifier (i.e. between the transmit path and ground) for shorting high frequency signals, and an inductance in series with the output of the power amplifier, for choking high frequency signals along the transmit path. Such a filter has a corner frequency which inversely depends upon the square root of the inductance of the filter and the square root of the parallel capacitance of the filter. Thus, in order to decrease the corner frequency of the low pass filter (e.g. to prevent the transmission of the lower band second harmonic when operating in the lower band mode) one could either increase the capacitance to allow lower frequency signals to be shorted, or increase the inductance to provide greater impedance to lower frequency signals traveling along the transmit path.

The basic known method for increasing either the capacitance or the inductance is to use a diode as an on/off switch, the state of which is controlled by a dc bias voltage, to switch an extra capacitor or inductor into or out of the filter circuit. Where the total capacitance of the circuit is to be controlled, the diode is placed in series with an additional capacitor; when the diode is switched on the additional capacitance is included in the filter and the corner frequency of the filter is lowered. This has the disadvantage that the diode needs to be switched off when the transmitter is operating in the higher band, and this requires that a large negative bias voltage be applied to the diode to maintain the diode in an off state when large rf signals are being passed through the switchable filter. This is disadvantageous because a negative voltage generator needs to be provided just for this purpose (which increases the cost of the filter).

In the case of the inductance, an extra inductor can be switched into and out of a circuit by providing a by-pass (short circuit path comprising ideally just a diode although extra components such as decoupling capacitors, bias voltage generation circuitry and associated r.f. chokes etc. will also be required) in parallel with the extra inductor, which by-pass can be switched off by switching off the diode switch contained within the by-pass. This has the advantage that the diode is switched off when the transmitter is transmitting in the lower band mode so if there are two separate transmit paths with some degree of shielding between them, not such a large negative bias is required to maintain the diode in an off state (and such a voltage may already be available to the filter without requiring a dedicated voltage generation circuit). However, this arrangement is complex, has a heavy reliance on inductors which are difficult to manufacture accurately and most significantly, this solution is undesirably lossy (as a result of the resistance of the diode through which the entire wanted signal must flow) causing a loss of approximately 1 dB. of the r.f. signal when operating in the higher band.

SUMMARY OF THE INVENTION

According to a first aspect of the present invention, there is provided a dual band transmitter including a power amplifier having an output, a stub having a first and a second end and a switch which is switchable between a first and a second state, wherein the first end of the stub is coupled to the output of the power amplifier and the second end of the stub is coupled to the switch, whereby the second end of the stub may be substantially closed or opened in dependence upon the state of the switch.

The term stub is well known in the art and refers to an element which is capable of supporting standing electrical waves at particular resonant frequencies in dependence on the properties of the stub. For example, in longwave radio applications, stubs are typically formed from co-axial cables. However, in the microwave realm with which the present invention is more concerned, a stub may be more conveniently formed from a pair of parallel conductors with a suitable dielectric located therebetween (e.g. by printing one or more conductive tracks onto a printed circuit board substrate). Of course, other possible ways of constructing a suitable stub will be readily apparent to a person skilled in the art; for example, a suitable arrangement of discrete or distributed capacitors and inductors could be used (in accordance with well known transmission line theory, etc.).

Furthermore, it is well known that stubs can be used as fairly narrow-band notch filters (note that stubs cannot readily be used to build wide-band filters such as low-pass filters as required in a radio transmitter). Transmission line theory dictates that the frequency at which the notch (of a notch filter built from a stub) occurs depends on the length of the stub in terms of the wavelength of electrical excitations propagating through the stub and on whether the distal end of the stub is open or closed. Typically, for two stubs identical in all respects except that one has an open end and the other a closed end, the stub having an open end would prevent the passage (along a given transmit path) of electrical signals having a frequency half as large as those which would be blocked by the stub having a closed end if both stubs were connected in the same way to the transmit path. Note that in the present context, the term closed end refers to the second end of the stub being connected to ground (or more generally to the other conductor of the stub—this is usually a ground plane) such that the voltage at this point is forced to be constant (at ground) by analogy with an acoustic pipe with a closed end since no vibrations are possible at a closed end of an acoustic pipe and thus nodes are forced at the 'closed ends' (of both the stub and the acoustic pipe). Similarly, the term opened end refers to the case where the end of the stub is floating since this is analogous to the case of an acoustic pipe having an open end (note that anti-nodes will be formed at open ends when resonance is occurring).

Preferably, the dual band transmitter comprises a lower band power amplifier for operating at a lower band frequency; a higher band power amplifier for operating at a higher band frequency; a lower band transmit path between the output of the lower band power amplifier and a combining means; and a higher band transmit path between the output of the higher band power amplifier and the combining means, wherein the stub is connected to the higher band transmit path. Preferably, the lower band transmit path incorporates a lower band low pass filter for removing all signals having a frequency greater than or equal to the second harmonic of the lower band wanted signal, and the higher band transmit path includes a higher band low pass filter for removing all signals having a frequency greater than or equal to the second harmonic of the higher band wanted signal.

The present invention gives rise to a significant advantage over conventional arrangements because the stub provides a very efficient switchable filter which can be tuned to take out the second harmonic of the lower band power amplifier when the lower band power amplifier is operating, without the associated switch regenerating further harmonics itself because it is in an off state (when it is most likely to cause regeneration) only when the lower band power amplifier is operating (and thus only small currents are flowing in the higher band transmit path) and because when it is in an on state, the wanted signal does not need to pass through this switch. Thus an active switch (such as a diode) may be used without causing any of the disadvantages usually associated with using an active switch in a transmit path. The fact that the stub only provides very narrow-band notch filtering is not a problem in the case of a radio communication system such as GSM where the wanted transmitted signal only occupies a relatively narrow frequency band, and where most of the noise generated by the power amplifier occurs only at harmonics of the wanted signal.

Preferably, the switch is formed by means of a relatively simple PIN diode which can be switched into an on state by the application of a forward biasing positive dc voltage, or into an off state by removing all dc bias from the diode.

The present invention gives rise to the significant advantages over the conventional arrangements discussed above of not requiring a large amount of shielding between the transmit paths, not requiring a large negative voltage generator (since the diode will be off only when only small currents are flowing in the higher band transmit path) and of giving rise to only a very small loss of signal strength (e.g. 0.2 dB).

According to a particularly preferred embodiment of the present invention, the transmitter is a dual band transmitter in which the higher band is twice the frequency of the lower band, as is the case, for example, in a GSM/DCS dual band transmitter. Such an arrangement is particularly advantageous because the stub will act to at least partially filter out the second harmonic of the higher band signal when operating in the higher band because a closed end stub is approximately equivalent to an open end stub of half the length (thus acting as a notch filter with the notch at twice the frequency). In order to compensate for any parasitic capacitance of the switch, the switch preferably includes suitable compensation means. According to one preferred embodiment, the compensation means includes a small negative voltage bias supply to the switch for reducing the parasitic capacitance of the switch when in an off-state. According to another preferred embodiment, the compensation means includes tuning elements in the form of further passive capacitors and/or inductors. Alternatively, a switch can be used which has a very low parasitic capacitance even when it is unbiased, preferably of less than 0.3 pF at 0V bias.

According to a second aspect of the present invention, there is provided a surface mounted device for use in a oual band transmitter, comprising a stub having a first end for connection to a higher band transmit path of the dual band transmitter and a second end, and a switch having a first terminal for connection to a bias voltage supply terminal and to the second end of the stub and having a second terminal for connection to a fixed reference voltage, wherein the switch comprises a diode whose state may be varied between an on state and an off state by supplying either a positive voltage or a substantially zero or negative voltage to the first terminal of the switch. Preferably the device includes a resistor having a first terminal for connection to the first terminal of the switch and a second terminal for connection to the bias voltage supply terminal whereby the bias voltage supply terminal may be connected to the first terminal of the switch via the resistor. The device may further include an inductor connected in series with the resistor whereby the bias voltage supply terminal may be connected to the first terminal of the switch via both the resistor and the inductor.

The stub is preferably printed on a small piece of ceramic.

BRIEF DESCRIPTION OF THE DRAWINGS

In order that the present invention may be better understood, embodiments thereof will now be described by way of example only with reference to the accompanying drawing in which the sole FIGURE is a block diagram of a dual band radio transmitter in accordance with the present invention.

DETAILED DESCRIPTION OF THE INVENTION

The FIGURE illustrates a dual band transmitter 1 comprising a lower band Power Amplifier (PA) which in this specific example is taken to be a GSM band PA 2, a higher band PA which in this case is taken to be a DCS PA 3, a GSM (lower band) transmit path 4, a DCS (higher band) transmit path 5, a stub arrangement 6, a switch bias voltage supply means 7, a GSM/DCS (lower band/higher band) combining means 8 and an aerial 9. The GSM band transmit path 4 is connected between the output of the GSM PA 2 and a first input of the GSM/DCS combining means 8. The DCS transmit path 5 is connected between the output of the DCS PA 3 and a second input of the GSM/DCS combining means 8. The output of the GSM/DCS combining means 8 is connected to the aerial 9. The stub arrangement 6 is connected to the DCS transmit path 5. The switch bias voltage supply means 7 is connected to the stub arrangement 7.

The GSM transmit path 4 includes a GSM load line 42 and a GSM Low Pass Filter (LPF) 48. The GSM load line 42 is adapted to provide a matched load for the GSM PA 2 (accounting for the effects of the other components connected to the output of the GSM PA 2). The GSM LPF 48 is adapted to substantially remove all of the unwanted harmonics (at 1800 MHz, 2700 MHz, etc.) generated as a result of non-linearities (and other effects) within the PA 2 while permitting signals at the GSM frequency (900 MHz) to pass substantially undiminished.

The DCS transmit path 5 includes a DCS load line 52, a DCS LPF 58 and a conductive section 54 which is adapted for having a good electrical connection made therewith. The DCS load line 52 corresponds to the GSM load line 42 (though it is adapted to ensure that the DCS PA 3 sees a matched load rather than the GSM PA 2). The DCS LPF 58 corresponds to the GSM LPF 48 except that it has a corner frequency substantially higher than that of the GSM LPF since it must allow signals at the DCS frequency (1800 MHz) to pass substantially undiminished, while removing all of the unwanted harmonics (3600 MHz, 5400 MHz, etc.).

The stub arrangement 6 includes a stub 60 having a first or connecting end 61 and a second or distal end 62; a de-coupling resistor 63 having a resistance of approximately 1 KΩ and an external terminal 64 and an internal terminal which is connected to the distal end 62 of the stub 60; and a diode 65 which operates as a switch 65 having a first terminal 66 which is connected to the distal end 62 of the stub 60 (and thus also to the internal terminal of the resistor 63) and a second terminal for externally connecting to a fixed reference voltage in the form of ground.

The switch bias voltage supply means 7 includes an external bias voltage supply terminal 71 at which one of two possible different bias voltages (+3V or 0V) may be applied. The external bias voltage supply terminal 71 is connected to the external terminal 64 of the de-coupling resistor 63.

The operation of the dual band radio transmitter 1 will now be described. When operating in the GSM mode, a signal to be transmitted is input to the GSM PA 2 where it is greatly amplified. Owing to the large non-linearities in PA 2 (and for other reasons) the signal which is output by the PA 2 will contain a lot of unwanted harmonic signals. These unwanted harmonics are easily filtered by the GSM LPF 48 and then out put, via the combining means 8, to aerial 9 where the wanted signal is broadcast. In addition, however, because the two PA's 2,3 are integrated onto the same IC, some leakage of the signals output by PA 2 occurs both directly to the DCS transmit path 5 and to the DCS PA 3 (which is not powered at this time). The signals leaked to the DCS PA 3 will cause the spurious regeneration of all harmonics of the GSM signal including the second harmonic (1800 MHz). The DCS LPF 58 is adapted to allow signals at the DCS frequency (1800 MHz) to pass unhindered, thus, if it were not for the stub arrangement 6, an unacceptably high level (i.e. contravening GSM specifications) of unwanted second harmonic signals would be broadcast by this arrangement in addition to the wanted GSM signals.

When the transmitter 1 is operating in the GSM mode, the switch bias voltage supply means 7 supplies a bias voltage of 0V to the external supply terminal 71. This effectively turns the switch 65 off (when the diode is not forwardly biased no current will flow through it). This in turn causes the stub 60 to be open ended and it behaves as an open quarter wavelength line for signals at 1800 MHz, in parallel with the DCS transmit path 5, reflecting theoretically all the energy around those frequencies back to the DCS transmit path 5 where they destructively interfere with the unreflected signals traveling along the the DCS transmit path which will be out of phase with the reflected signals. In this case, the diode 65 is only exposed to a small amount of RF energy (that which results from leakage from the GSM PA and transmit path only) This means that the diode will not regenerate any significant amount of harmonics even without a large negative biasing voltage being applied to the diode.

When the transmitter 1 is operated in a DCS mode, leakage from the DCS PA or transmit path to the GSM PA or transmit path is not a problem because any unwanted harmonics (e.g. 3600 MHz, 5400 MHz, etc.) will be filtered by the GSM LPF 48. The switch bias voltage supply means 7 supplies a bias voltage of +3V to the external supply terminal 71. This effectively turns the switch 65 on (when the diode is forwardly biased current will flow through it freely and it behaves as a pure resistor having a very low resistance of, for example, 0.2–1.0Ω). This in turn causes the stub 60 to be closed at its distal end and it behaves as a shunted quarter wavelength line for signals at 1800 MHz, in parallel with the DCS transmit path 5. This represents a very high impedance in parallel with the impedance of the transmit path 5, combining means 8 and aerial 9 which is typically about 50Ω. This gives rise to a very small loss of signal strength of about 0.2 dB. Note that although the diode is exposed to a high level of RF energy in this mode, because it is forwardly biased it is very linear and behaves as an almost pure and constant resistance of low value. Thus, the diode has been measured in this arrangement as having a dynamic (the ratio of the maximum wanted signal to the noise generated) of 120 dB.

Furthermore, when operating in the DCS mode, the stub 60 will behave as a closed half wavelength line at approximately the second harmonic (3600 MHz) of the DCS frequency (1800 MHz). This has a similar effect to the open quarter wavelength line and effectively filters out substantially all signal energy at that frequency. However, because the diode may have some parasitic capacitance when it is turned off, the stub will generally need to be a little shorter than would otherwise be the case for acting as an open quarter wavelength line at GSM frequencies when the diode is off, which parasitic capacitance will be absent when the diode is on. In order to compensate for this effect, the switch bias voltage supply means 7 could provide a small negative bias voltage at its terminal 71 instead of 0V when operating in the GSM mode. This will significantly reduce the parasitic capacitance of the diode and thus improve the filtering at the DCS second harmonic when operating in the DCS mode. Such a voltage is usually readily available on radio power amplifiers (PAs) employing GaAs technologies which generally require a small negative voltage for properly controlling the biasing of the PAs. Alternatively, or in addition, a more expensive diode could be used which has a very low parasitic capacitance even when no negative biasing voltage is applied. A further solution is to use additional passive tuning elements connected between the diode 65 and the distal end of the stub 62 or connected at the far end of the diode 65 to effectively extend the length of the stub when the diode is turned on (to compensate for the effective extension of the length of the stub caused by the parasitic capacitance of the diode when the diode is turned off).

The stub arrangement 6 may be formed using discrete components (e.g. resistor 63, diode 65 etc.) with the stub being printed directly onto a printed circuit board. However an alternative arrangement is to form the arrangement into a single device incorporating a ceramic material having a high relative permittivity which permits the stub to have a much shorter length than would otherwise be the case.

What is claimed is:

1. A dual band transmitter comprising a lower band power amplifier for operating at a lower band frequency; a higher band power amplifier for operating at a higher band frequency; the amplifiers each having an output; antenna means; combining means for coupling signals from said amplifiers to said antenna means; a lower band transmit path between the output of the lower band power amplifier and the combining means; a higher band transmit path between the output of the higher band power amplifier and the combining means; a switch which is switchable between a first and a second state, a stub having a first end coupled to the higher band transmit path and a second end coupled to the switch, whereby the second end of the stub is substantially closed or opened in dependence upon the state of the switch, and switch operating means for controlling the state of said switch so that, when said lower band power amplifier is active, said stub reduces substantially the propagation of spurious harmonics from the lower band transmit path in the higher band transmit path and said higher band power amplifier and, when said higher band power amplifier is active, said stub enables higher band frequency signals to propagate along said higher band transmit path from said higher band power amplifier to said antenna means.

2. A dual band transmitter as claimed in claim 1 wherein the lower band transmit path incorporates a lower band low pass filter for removing all signals having a frequency greater than or equal to the second harmonic of the lower band wanted signal, and the higher band transmit path includes a higher band low pass filter for removing all signals having a frequency greater than or equal to the second harmonic of the higher band wanted signal.

3. A dual band transmitter as claimed in claim 1 wherein the higher band frequency is substantially equal to twice the lower band frequency.

4. A dual band transmitter as claimed in claim 1 wherein the switch includes compensation means for compensating, when the switch is switched on, for the effect of the parasitic capacitance of the switch which is present when the switch is switched off.

5. A dual band transmitter as claimed in claim 1 wherein said stub is connected in parallel with said higher band transmit path and is of a length such that, when said lower band power amplifier is active, it reflects substantially all the energy at said higher frequency band back into said higher band transmit path to interfere destructively with the un-reflected energy at said higher frequency band and, when said higher band power amplifier is active, it does not substantially reflect energy at said higher frequency band back into said higher band transmit path.

6. A dual band transmitter as claimed in claim 1 wherein the switch is an active switch that is non-conductive when said lower band power amplifier is active and is conductive when said higher band power amplifier is active.

7. A dual band transmitter as claimed in claim 6 wherein the switch is a diode.

8. A dual band transmitter as claimed in claim 7, wherein said diode has a first terminal for connection to a bias voltage supply and to the second end of the stub and a second terminal for connection to a reference voltage supplied by said switch operating means, wherein the state of the diode may be varied between an on state and an off state by supplying either a positive voltage or a substantially zero or negative voltage to a terminal of the diode.

9. A dual band transmitter as claimed in claim 8 wherein said switch operating means includes a resistor having a first terminal for connection to the first terminal of the switch and a second terminal for connection to the bias voltage supply terminal whereby the bias voltage supply terminal may be connected to the first terminal of the switch via the resistor.

10. A dual band transmitter as claimed in claim 9 wherein the stub is formed in a ceramic having a relatively high relative permittivity.

* * * * *